United States Patent [19]
Tanaka et al.

[11] Patent Number: 6,081,353
[45] Date of Patent: Jun. 27, 2000

[54] COLOR IMAGE PROCESSING DEVICE

[75] Inventors: Tatsuya Tanaka, Yamatokoriyama; Makio Gotoh, Nara; Yoshinori Murakami, Yamatokoriyama, all of Japan

[73] Assignee: Sharp Kabushiki Kaisha, Osaka, Japan

[21] Appl. No.: 09/046,163

[22] Filed: Mar. 23, 1998

[30] Foreign Application Priority Data

Mar. 27, 1997 [JP] Japan ................................. 9-075566

[51] Int. Cl.$^7$ ........................................................ G03F 3/08
[52] U.S. Cl. ........................ 358/523; 358/518; 358/525; 358/1.9; 382/167
[58] Field of Search .................................. 382/167, 162, 382/274; 395/109; 358/504, 518–525

[56] References Cited

U.S. PATENT DOCUMENTS

| | | | |
|---|---|---|---|
| 4,839,722 | 6/1989 | Barry et al. ................................ | 358/80 |
| 4,970,584 | 11/1990 | Sato et al. ................................ | 358/75 |
| 5,121,196 | 6/1992 | Hung ........................................ | 358/75 |
| 5,168,373 | 12/1992 | Nakamura ................................ | 358/406 |
| 5,262,833 | 11/1993 | Fukushima et al. ..................... | 355/327 |
| 5,489,998 | 2/1996 | Yamada et al. .......................... | 358/523 |
| 5,614,934 | 3/1997 | Yoshida et al. .......................... | 347/189 |
| 5,664,072 | 9/1997 | Ueda et al. .............................. | 395/109 |
| 5,801,855 | 9/1998 | Ohta ......................................... | 358/518 |
| 5,828,781 | 10/1998 | Nakano .................................... | 382/167 |
| 5,835,243 | 11/1998 | Mori ......................................... | 358/518 |

FOREIGN PATENT DOCUMENTS

| | | |
|---|---|---|
| 0 415 754 A1 | 3/1991 | European Pat. Off. . |
| 0 500 134 A2 | 8/1992 | European Pat. Off. . |
| 0 515 162 A2 | 11/1992 | European Pat. Off. . |
| 0 747 853 A2 | 12/1996 | European Pat. Off. . |
| 62-233976 | 10/1987 | Japan . |
| 8-098042 | 4/1996 | Japan . |

*Primary Examiner*—Kimberly A. Williams
*Assistant Examiner*—Derrick Fields
*Attorney, Agent, or Firm*—David G. Conlin; Richard E. Gamache

[57] ABSTRACT

A color image processing device includes color conversion means for outputting color adjusted signals having been chromatically adjusted in accordance with the input of separated color signals obtained from a scanner and a variable factor signal other than color signals. The color conversion means includes a memory device for discretely storing only the color adjusted signals that correspond to predetermined separated color signals and a predetermined variable factor signal, and color adjusting means for, when the inputted separated color signal or the inputted variable factor signal directly corresponds to none of the color adjusted signals stored in the memory means, outputting color adjusted signals having been interpolated in accordance with the known color adjusted signals found in a neighborhood of the inputted separated color signals and variable factor signal.

10 Claims, 5 Drawing Sheets

FIG. 2

| TOTAL NUMBER OF PRINTED SHEETS | RESOLUTION (dpi) | TEMPERATURE (°C) | HUMIDITY (%) | TONER LOT NUMBER |
|---:|---:|---:|---:|---:|
| 10 | 72 | 0 | 0 | 00 |
| 100 | 100 | 10 | 20 | 01 |
| 1000 | 200 | 15 | 30 | 02 |
| 5000 | 300 | 20 | 40 | 03 |
| 10000 | 400 | 25 | 50 | 04 |
| 50000 | 600 | 30 | 60 | 05 |
| 100000 | 900 | 35 | 70 | 06 |
| 200000 | 1200 | 40 | 80 | 07 |
| 500000 | 1800 | 50 | 100 | 08 |

…

COLOR IMAGE PROCESSING DEVICE

FIELD OF THE INVENTION

The present invention relates to a color image processing device incorporated in a digital color copying machine for scanning and copying color images, or in an apparatus for outputting images read by a scanner to a color printer and a color display device.

BACKGROUND OF THE INVENTION

As for a conventional color image processing device 100 of this kind, e.g. a color printer, digital separated color signals are produced for the r (red), g (green), and b (blue) colors as a result of a scanner 102 reading a color original 101 by optical scanning, for example, as shown in FIG. 4. The separated color signals are corrected by γ-correction means 103 for level, non-linearity, etc. and transmitted to color adjusting means 104.

As will be detailed later, the separated color signals are chromatically adjusted and converted into separated color signals for the C (cyan), M (magenta), and Y (yellow) colors by the color adjusting means 104, before being transmitted to a printer section 105 for a print-out.

The color adjusting means 104 is provided as above for following reasons.

The characteristics of the scanner 102 and the printer section 105 vary greatly from one model to another. If the separated color signals produced by the scanning by the scanner 102 are converted into the colors of C, M, and Y for a print-out without being chromatically adjusted, the copied image has different colors from those of the original. The color adjusting means 104 performs color adjustment so that original colors can be reproduced precisely.

Conventionally, it has been suggested that the following three-dimensional look-up table, as an example, is to be stored as data in a memory device 106 for the use in the color adjustment by the color adjusting means 104.

The three-dimensional look-up table is produced in the following manner. Data for producing color samples of, for example, 9×9×9=729 colors, which are combinations of the values of C, M, and Y, is produced by a device (not shown) so that those colors available for output are chromatically adjusted uniformly. The data is then outputted to the printer section 105 to produce color samples. Subsequently, the color samples are read by the scanner 102 to derive separated color signals. The relations between the r, g, and b values of the separated color signals and the C, M, and Y values of the data for producing the color samples are stored in the memory device 106 as the data on the separated color signals for C, M, and Y corresponding to those for r, g, and b in the form of a three-dimensional look-up table.

More specifically, the three-dimensional look-up table is configured as shown in FIG. 5(*a*): The inputted separated color signals for r, g, and b are located as three-dimensional space coordinates. The separated color signal coordinates are divided into unitary cubes. Optimum separated color signals to be outputted then become related to vertex coordinates of the unitary cubes.

In such a case, for a reduction in data volume to be stored, the correspondence table for the data on the separated color signals and the color adjusted signals deals with a limited number of colors. As for the input of separated color signals that cannot be found in the three-dimensional color look-up table, interpolative calculations are done on the three-dimensional data on the basis of the known color adjusted signals found in a neighborhood of the inputted separated color signals.

Specifically, as shown in FIG. 5(*b*), the interpolative calculation described in the following formula (1) is performed on the data on the eight vertexes of the unitary cube to which the data belongs:

$$Dx = \sum_{i=1}^{8} Dxi \cdot Vi \Big/ V \qquad (1)$$

$$\left( V = \sum_{i=1}^{8} Vi, \, x = C, M, Y \right)$$

where Dx represents a color adjusted signal, Dxi represents a known color adjusted signal, and Vi represents a volume of a rectangular parallelopiped located at the diagonal angle from the vertex.

The environment may affect the printer section 105 and causes aging in the characteristics of the device, which leads to printed results of undesirable colors.

U.S. Pat. No. 5614934, as an example, discloses a conventional technology that enables the printer to stably print desired colors regardless of such aging.

To be more specific, as shown in FIG. 4, a color sensor 109 and a feedback control section 107 are always provided. Every time a predetermined period of time elapses, color data acting as a reference is produced and outputted to the printer section 105 by a reference data producing section 108 for a print-out. The reference color derived in this manner are separated into color signals and read by the color sensor 109. The color signals are inputted to the feedback control section 107. The contents of the three-dimensional look-up table stored in the memory device 106 are altered on the basis of the color signal data that is read and the color data produced by the reference data producing section 108.

However, the color image processing device 100 having the conventional arrangement shown in FIG. 4 needs to be provided with, apart from the color adjusting means 104 and the memory device 106, those unique circuits 107, 108 and 109 to deal with aging, which makes the device more complex as a whole. Besides, in order to deal with aging, the user needs to perform the above operation regularly by him/herself, which is troublesome.

SUMMARY OF THE INVENTION

The present invention has an object to provide a color image processing device that can always stably reproduce original colors with a simple circuit arrangement, regardless of possible variations in variable factors, such as temperature and humidity, causing aging in the characteristics of the device, and that frees the user from troublesome operation.

A color image processing device in accordance with the present invention includes:

input means for reading an original and converting into separated color signals of three-dimensions or of higher dimensions; and output means for outputting a color image in accordance with the separated color signals, the color image processing device, further including color conversion means, to which the separated color signals obtained by the input means and a variable factor signal other than color signals are inputted, for outputting color adjusted signals having been chromatically adjusted in accordance with the inputted separated color signals and the inputted variable factor signal, wherein the color conversion means includes:
memory means for discretely storing only the color adjusted signals that correspond to predetermined separated color signals and a predetermined variable factor signal; and
data interpolation means for, when the inputted separated color signal or the inputted variable factor signal directly corresponds to none of the color adjusted signals stored in the memory means, outputting color adjusted signals having been interpolated in accordance with the known color adjusted signals found in a neighborhood of the inputted separated color signals and variable factor signal.

Consequently, the color image processing device can always stably reproduce original colors with a simple circuit arrangement, regardless of possible variations in variable factors, such as temperature and humidity, causing aging in the characteristics of the device. In addition, the color image processing device can free the user from troublesome operation and is very convenient to the user.

In the arrangement, the variable factor signal is preferably a signal obtained in accordance with at least a change in an aging factor, resolution, an environmental condition, and a supplied material. Moreover, the selection of variable factors such as temperature and humidity, which cause aging, as at least an inputted signal makes the device more useful in real situations.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a table depicting a method of producing a look-up table to be stored in a memory device of the color image processing device.

FIG. 5(a) shows three-dimensional space coordinates with separated color signals for r, g and b taken as coordinate axes, and FIG. 5(b) is an enlarged view showing the cross-hatched unitary cube in FIG. 5(a).

DESCRIPTION OF THE EMBODIMENT

The following description will discuss an embodiment in accordance with the present invention.

Figure 1:
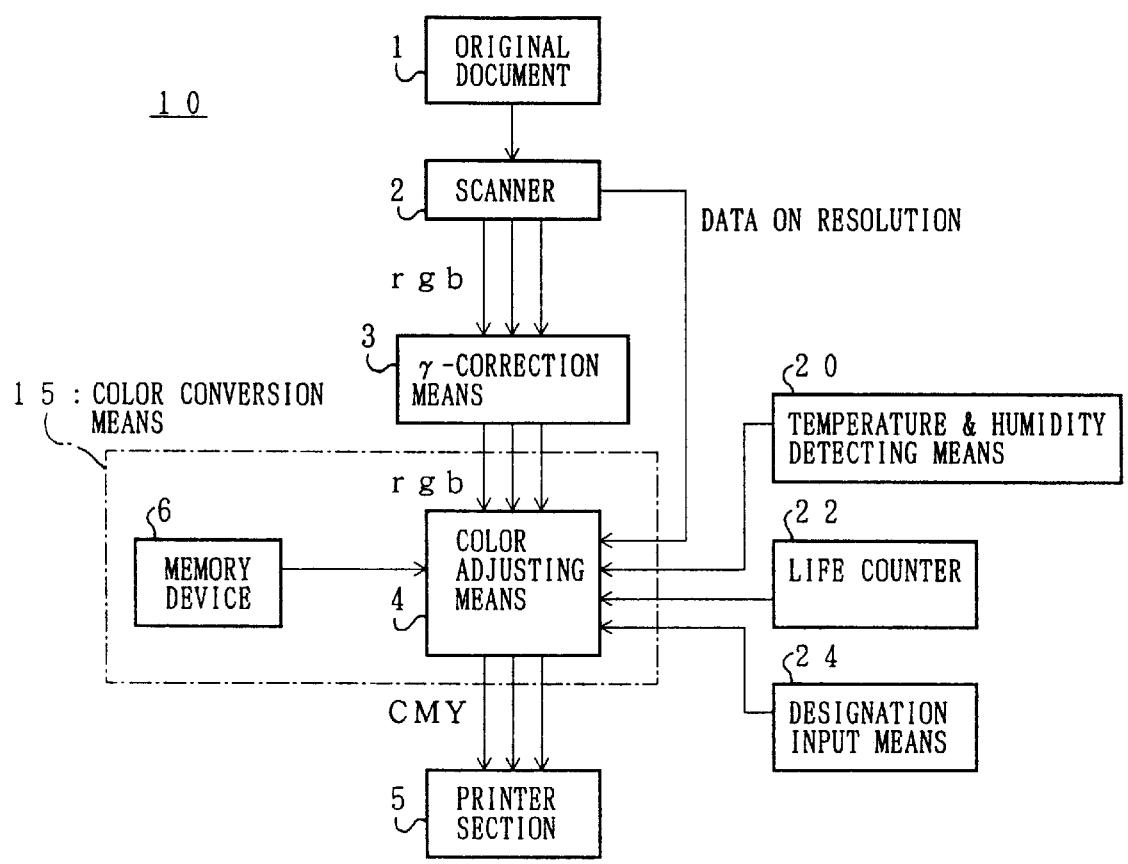
FIG. 1 is a block diagram schematically showing an arrangement of a color image processing device of an embodiment in accordance with the present invention.

FIG. 1 is a block diagram schematically showing an arrangement of a color image processing device 10 of an embodiment in accordance with the present invention. The color image processing device 10 includes a scanner (input means) 2, a y-correction means 3, a printer section (output means) 5, and color conversion means 15. The color conversion means 15 includes color adjusting means 4 and a memory device (memory means) 6.

Figure 4:
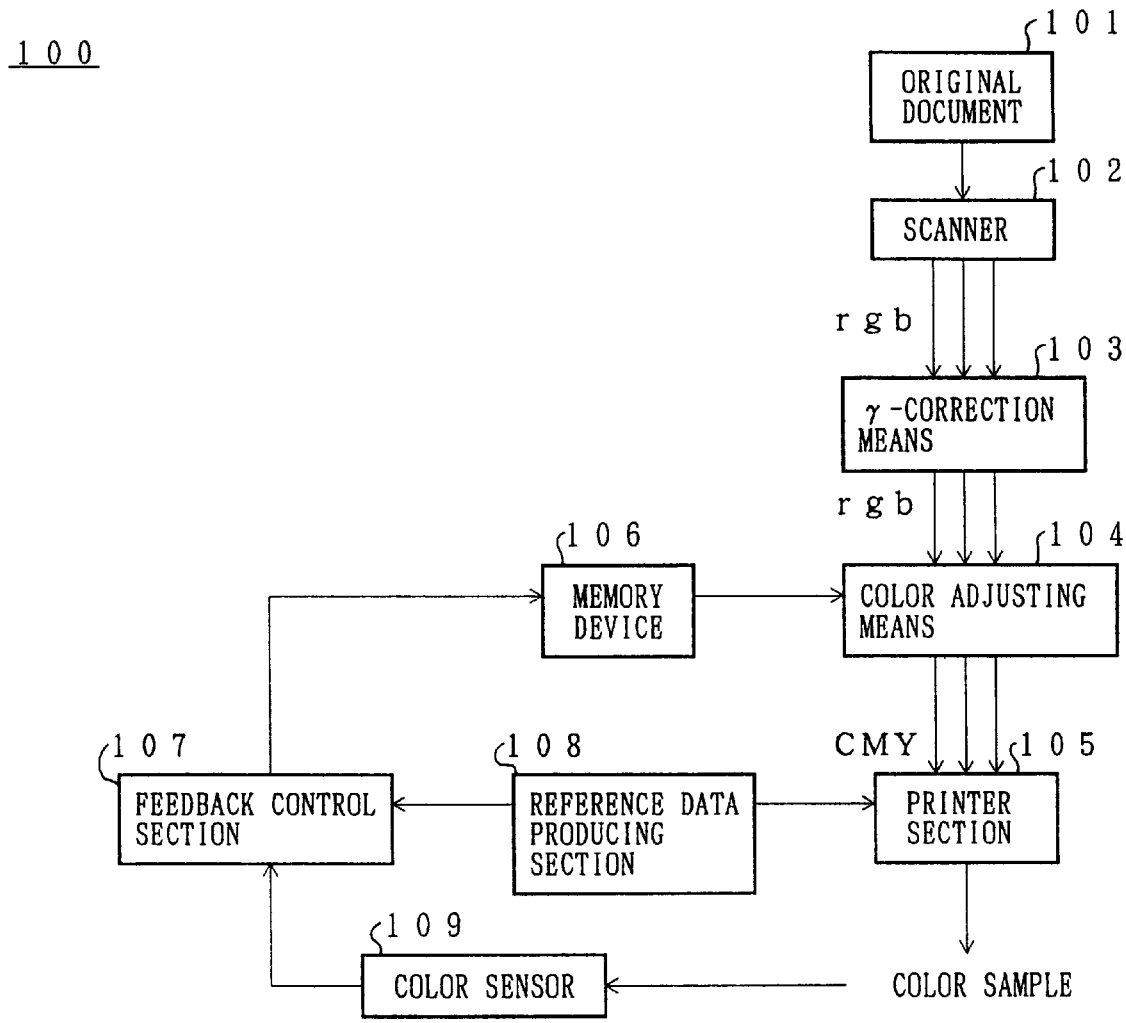
FIG. 4 is a block diagram schematically showing an arrangement of a conventional color image processing device.
Figure 5B:
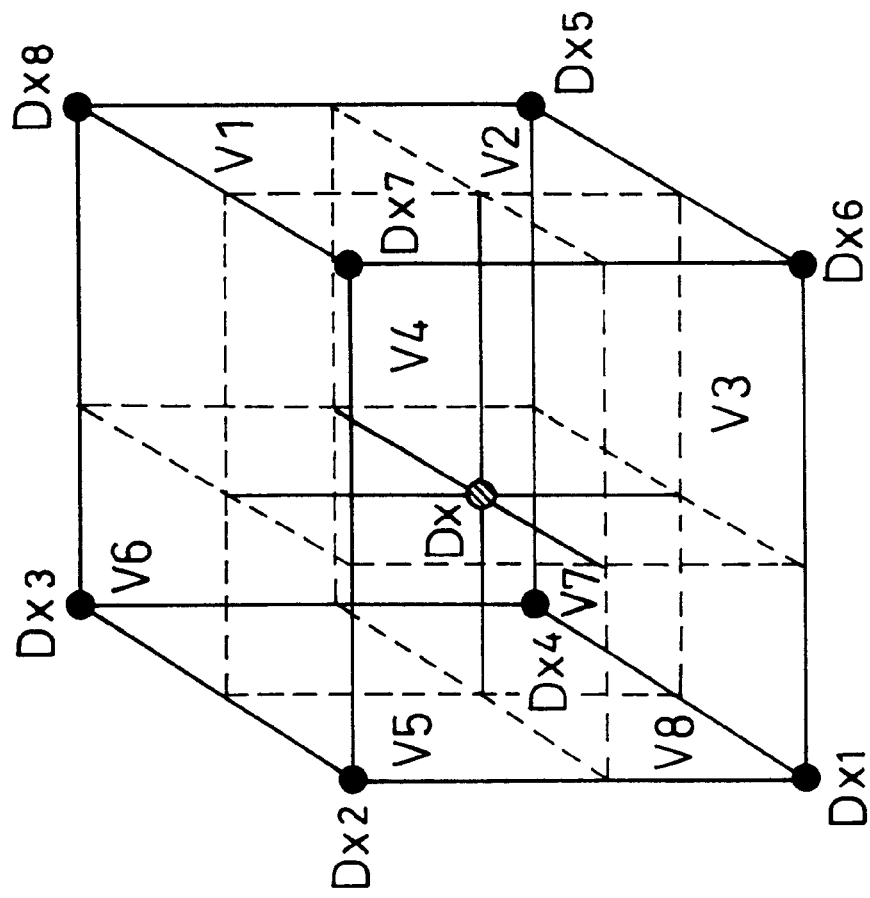
FIGS. 5(a) and 5(b) are drawings explaining how an interpolative calculation process is preformed on the basis of the three-dimensional look-up table.
Figure 5A:
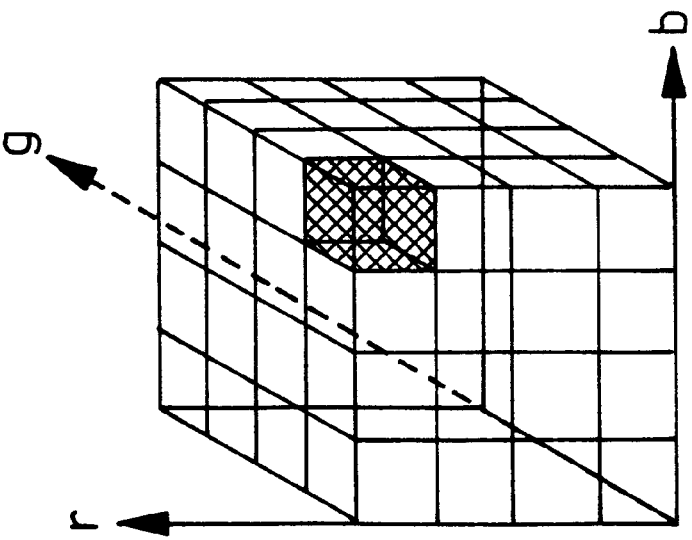

The scanner 2, the γ-correction means 3, and the printer section 5 are arranged in the conventional manner as shown in FIG. 4. Specifically, the scanner 2 reads a color original 1 by optical scanning, and produces digital separated color signals for r (red), g (green) and b (blue). The γ-correction means 3 carries out level and non-linearity correction on the separated color signals before transmitting the separated color signals to the color adjusting means 4. The separated color signals are chromatically adjusted and converted into color adjusted signals for C (cyan), M (magenta) and Y (yellow) by the color adjusting means 4, before being transmitted to the printer section 5. The printer section 5 carries out a print-out in accordance with the inputted color adjusted signals for C (cyan), M (magenta) and Y (yellow).

The color image processing device 10 includes temperature & humidity detecting means 20, a life counter 22, and a designation input means 24.

The following description will explain an arrangement of the color conversion means 15.

As mentioned above, the color conversion means 15 includes the color adjusting means 4 and the memory device 6. The color adjusting means 4 is arranged to receive, in real time, data on resolution transmitted from the scanner 2, data on temperature and humidity transmitted from the temperature & humidity detecting means 20, and data on supplied materials such as the total number of printed sheets transmitted from the life counter 22 and the toner lot number, paper quality, and photosensitive body designated by way of input through the designation input means 24. The color adjusting means 4 performs a color adjusting operation in accordance with the above data and data stored in advance in the memory device 6.

In the color image processing device 10, the color adjusting means 4 performs interpolative calculations as will be detailed below, and therefore doubles as data interpolation means.

The memory device 6 includes RAM. The following description will explain how the data to be stored in advance in the memory device 6 is produced.

Data for producing color samples of, for example, 9×9×9=729 colors, which are combinations of the values of C, M, and Y, is produced by a device (not shown) so that those colors available for output are chromatically adjusted uniformly. The data is then outputted to the printer section 5 to produce color samples. Subsequently, the color samples are read by the scanner 2 to derive the separated color signals for r, g and b.

Subsequently, the r, g, and b values of the separated color signals and the C, M, and Y values of the data for producing the color samples are related in the same manner as in the conventional case. More specifically, the inputted separated color signals for r, g, and b are located as three-dimensional space coordinates. The separated color signal coordinates are divided into a plurality of unitary cubes. Optimum color adjusted signals to be outputted then become related to vertex coordinates of the unitary cubes. The optimum color adjusted signals are stored in the memory device 6.

As shown in FIG. 2, the above operation is repeatedly done by varying the values of variable factors such as the total number of printed sheets (=T), resolution, temperature, humidity, and toner lot number.

For a reduction in data volume to be stored in the memory device 6, data sampling is done by varying the variable factors discretely with proper intervals.

Figure 3:
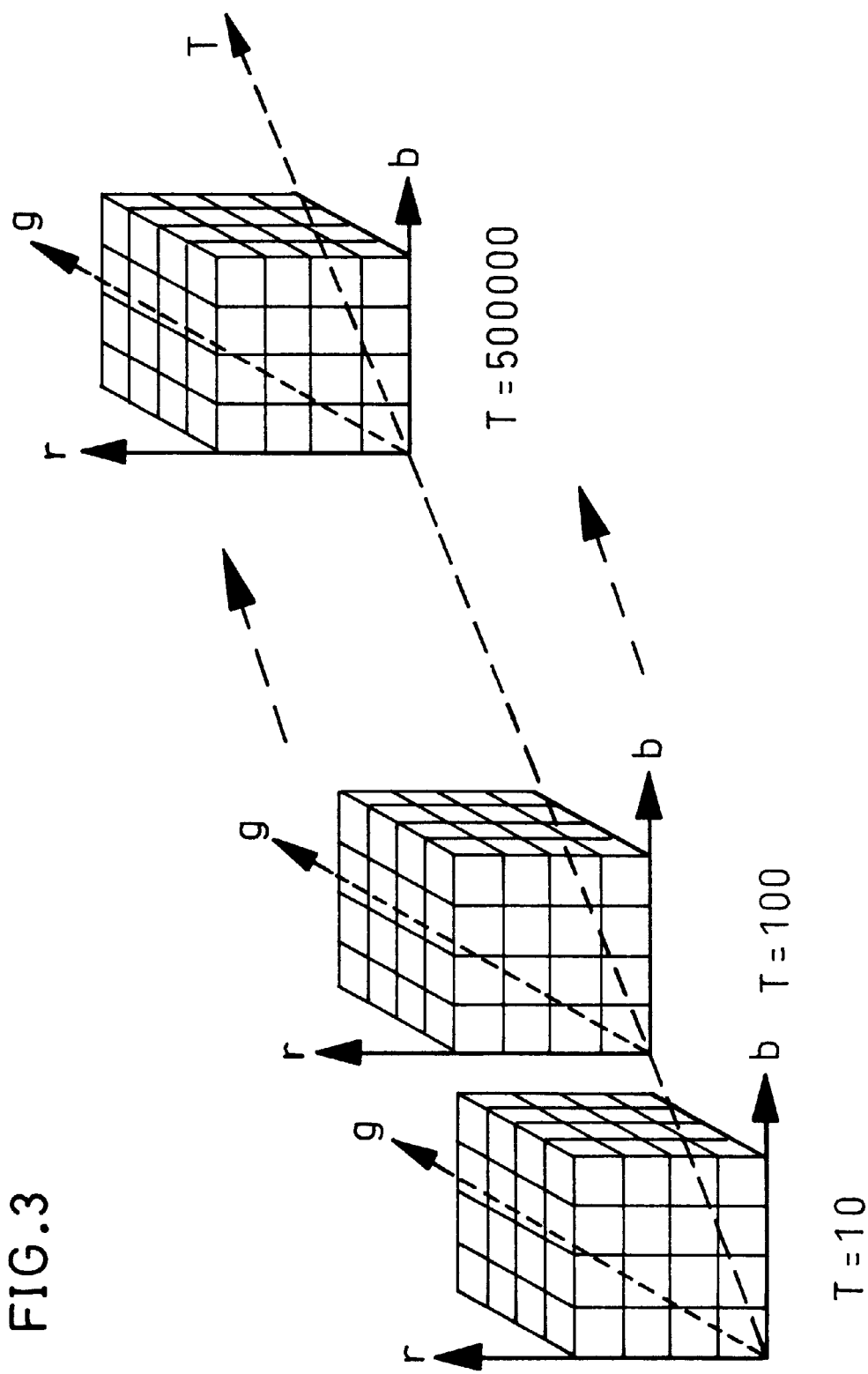
FIG. 3 is a drawing showing contents of the look-up table stored in the memory device of the color image processing device.

F or example, if the total number of printed sheets T is selected as a fourth coordinate axis, the memory device 6 stores a look-up table as shown in FIG. 3. Note that FIG. 3 shows the total number of printed sheets T s elected as the fourth coordinate axis for simplification, and that further addition of other variable factors including the resolution, temperature, humidity, etc. as coordinate axes will complete the look-up table.

As the color original 1 is read by the scanner 2, the separated color signals for r, g, and b are produced. The separated color signals are transmitted to the color adjusting means 4 after being corrected by the γ-correction means 3 for level and non-linearity correction.

The separated color signals are chromatically adjusted and converted into color adjusted signals for C, M and Y by the color adjusting means 4, before being transmitted to the printer section 5 for a print-out.

The color adjusting means 4 performs a color adjusting operation in accordance with the data stored in the memory device 6 in advance as shown in FIG. 3 together with the data on the resolution transmitted from the scanner 2, the data on temperature and humidity transmitted from the temperature & humidity detecting means 20, and the data on supplied materials such as the total number of printed sheets transmitted from the life counter 22 and the toner lot number, paper quality, and photosensitive body designated by way of input through the designation input means 24.

If the data on the inputted separated color signals and the variable factor signals directly correspond to the color adjusted signals stored in the memory device 6, the corresponding color adjusted signals are outputted without being modified. By contrast, if the data on the inputted separated color signals and the variable factor signals does not directly correspond to the color adjusted signals stored in the memory device 6, interpolative calculations are preformed using data on the known color adjusted signals found in a neighborhood as will be detailed later. Note that when the inputted variable factor signal represents the toner lot number, since no continuous data is available for input, interpolation is unnecessary.

Similarly to the case of the formula (1) where an interpolative calculation is done on the data on the eight vertexes of the unitary cube, an interpolative calculation is performed according to the following formula (2), which is expanded from the formula (1) for inputted signals of n-dimensions (n is an integral number larger than 4):

$$Dx = \sum_{i=1}^{2^n} Dxi \cdot Vi \Big/ V \qquad (2)$$

$$\left( V = \sum_{i=1}^{2^n} Vi, x = C, M, Y \right)$$

where Dx represents a color adjusted signal derived from the interpolation, Dxi represents the known color adjusted signal on a vertex, and Vi represents the volume of a rectangular parallelopiped located at the diagonal angle from the vertex.

Consequently, the color image processing device 10 of the present embodiment can always stably reproduce original colors with a simple circuit arrangement, regardless of possible variations in the variable factors such as the total number of printed sheets (=T), resolution, temperature, humidity, and toner lot number. In addition, optimum color adjustment conditions are set automatically in response to variations in the total number of printed sheets (=T), resolution, temperature, humidity, toner lot number, and other variable factors, liberating the user from otherwise annoying adjustment.

So far, the embodiment has been described without detailing the intervals between the lattice points of the variable factors. The interpolative method may be applied to both mutually equal intervals and different intervals.

The above interpolative method is not the only method; a different method may be employed. As for the outputted color adjusted signals, C, M, Y, and K (black) may be adopted in place of C, M and Y.

As described so far, the color image processing device 10 includes a scanner 2 for reading an original and converting into separated color signals of three-dimensions or of higher dimensions, and a printer section 5 for outputting a color image in accordance with the separated color signals, and further includes color conversion means 15 for outputting color adjusted signals having been chromatically adjusted in accordance with the input of the separated color signals obtained from the scanner 2 and a variable factor signal other than color signals. The color conversion means 15 includes a memory device 6 for discretely storing only the color adjusted signals that correspond to predetermined separated color signals and a predetermined variable factor signal, and data interpolation means 4 for, when the inputted separated color signal or the inputted variable factor signal directly corresponds to none of the color adjusted signals stored in the memory device 6, outputting color adjusted signals having been interpolated in accordance with the known color adjusted signals found in a neighborhood of the inputted separated color signals and variable factor signal.

Consequently, original colors can be always stably reproduced with a simple circuit arrangement, regardless of possible aging in the characteristics of the device caused by affections by variable factors such as temperature and humidity, which liberates the user from otherwise annoying adjustment.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A color image processing device, including:
input means for reading an original and converting into separated color signals of three-dimensions or of higher dimensions; and
output means for outputting a color image in accordance with the separated color signals,
said color image processing device, comprising
color conversion means, to which the separated color signals obtained by the input means and a variable factor signal other than color signals are inputted, for outputting color adjusted signals having been chromatically adjusted in accordance with the inputted separated color signals and the inputted variable factor signal,
wherein the color conversion means includes:
memory means for discretely storing only the color adjusted signals that correspond to predetermined separated color signals and a predetermined variable factor signal; and
data interpolation means for, when the inputted separated color signal or the inputted variable factor signal directly corresponds to none of the color adjusted signals stored in the memory means, outputting color adjusted signals having been interpolated in accordance with the known color adjusted signals found in a neighborhood of the inputted separated color signals and variable factor signal.

2. The color image processing device as defined in claim 1, wherein the variable factor signal is a signal obtained in accordance with at least a change in an aging factor, resolution, an environmental condition, and a supplied material.

3. The color image processing device as defined in claim 1, further comprising a life counter for counting the total number of printed sheets, wherein the variable factor signal includes at least data on the total number of printed sheets.

4. The color image processing device as defined in claim 1, further comprising temperature and/or humidity detecting means for detecting temperature and/or humidity, wherein the variable factor signal includes at least data on the temperature and/or humidity.

5. The color image processing device as defined in claim 1, further comprising designation input means for inputting data on a supplied material to the color conversion means, wherein the variable factor signal includes at least the data on the supplied material.

6. The color image processing device as defined in claim 5, wherein the data on the supplied material includes at least a piece of data on a toner lot number, paper quality, and a photosensitive body.

7. The color image processing device as defined in claim 1, wherein the input means outputs data on resolution to the color conversion means, and the variable factor signal includes at least the data on the resolution.

8. The color image processing device as defined in claim 1, wherein the separated color signals inputted to the color conversion means include at least separated color signals for three colors of red, green, and blue, and the memory means discretely stores only the color adjusted signals that correspond to predetermined red, green and blue separated color signals and a predetermined variable factor signal.

9. The color image processing device as defined in claim 8, wherein the memory means locates the inputted red, green and blue separated color signals as three-dimensional space coordinates, divides the coordinates into a plurality of unitary cubes, relates an optimum color adjusted signal to be outputted to a vertex coordinate of the unitary cube, and stores a look-up table using the variable factor signal as at least a fourth coordinate axis.

10. The color image processing device as defined in claim 9, when, in the interpolation, the signals inputted into the color conversion means have n-dimensions (n is an integral number larger than 4), and color adjusted signals for three colors of C (cyan), M (magenta) and Y (yellow) are obtained in accordance with the inputted red, green and blue separated color signals, said color image processing device performing an interpolative calculation in accordance with the following formula:

$$Dx = \sum_{i=1}^{2^n} Dxi \cdot Vi \Big/ V$$

$$\left( V = \sum_{i=1}^{2^n} Vi, \ x = C, M, Y \right)$$

where Dx represents a color adjusted signal derived from the interpolation, Dxi represents a known color adjusted signal on a vertex found in a neighborhood of the inputted signal, and Vi represents a volume of a rectangular cube located at a diagonal angle from the vertex.

* * * * *